3,405,099
POLYMERIZATION OF PYRROLIDONE EMPLOYING HALIDES OF GROUP IV ELEMENTS AS CHAIN INITIATORS
David Taber, Easton, Pa., assignor to GAF Corporation, a corporation of Delaware
No Drawing. Filed Apr. 4, 1958, Ser. No. 726,307
1 Claim. (Cl. 260—78)

The present invention relates to the polymerization of 5- and 6-membered lactams, such as pyrrolidone and piperidone.

The polymerization of a lactam, such as pyrrolidone, proceeds via a ring-chain polymerization to give polyamides of 4-aminobutyric acid. Thus:

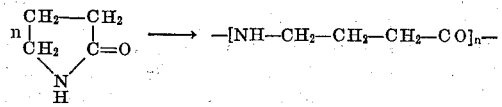

The recurring unit is one which might hypothetically arise in the condensation polymerization of 4-aminobutyric acid. However, early investigators, namely Gabriel (Berichte, 32, 1266 (1899)) and Schotten (Berichte, 21, 2240 (1880)), observed that 4-aminobutyric acid and 5-aminovaleric acid failed to undergo intermolecular condensation and yielded only the five and six membered lactams. The first disclosure of such polyamides was that of U.S.P. 2,638,463 (W. O. Ney, W. R. Nummy and C. E. Barnes, May 12, 1953), involving the polymerization of pyrrolidone in the presence of an alkaline polymerization catalyst.

While useful polymers are obtained by the process described in the Ney, Nummy and Barnes patent, No. 2,638,463, considerable difficulty is encountered in obtaining these polymers in satisfactory yields; and, also, in the production of polymers having relatively high molecular weights. Patent No. 2,739,959 of Ney and Crowther, which, in Example I, discloses that only a small yield of low molecular weight polymer may be obtained when an alkaline polymerization catalyst is employed as the sole promoter of the polymerization of pyrrolidone, discloses effecting the alkaline polymerization of the lactams in the presence of a small amount of an acyl compound, as an activator for the alkaline polymerization catalyst; and preferably, carrying out the polymerization of a lactam while dispersed in an anhydrous hydrocarbon non-solvent therefore, in order to increase the yield and molecular weight of the polymer. The specific activators described in Patent No. 2,739,959, as having the property of increasing the rate of polymerization of lactams having 5- and 6-membered rings, are acyl pyrrolidones, acyl dipyrrolidones, organic peroxides, anhydrous lactones and alkyl esters. The Ney and Crowther patent discloses the use of these acyl compounds as activators for the alkaline polymerization catalyst.

I have now found that a particular class of halides of Group IV elements are capable of acting as chain initiators in the alkaline catalyzed polymerization of 5- and 6-membered lactams; e.g. of pyrrolidone and piperidone. This particular class of halides of Group IV elements has the role of initiating chain growth.

The class of halides of Group IV elements which I have found to be useful for initiating the alkaline catalyzed polymerization of pyrrolidone and piperidone, are those having the following general formula:

where M represents an element of Group IV, i.e. carbon, silicon, titanium, germanium, zirconium, tin, hafnium and lead, and $R_1R_2R_3R_4$ represents halogen, e.g. fluorine, chlorine, bromine and iodine, or hydrogen, alkyl, aryl, alkylene, arylene, cycloalkyl or cycloalkylene, with the proviso that at least one of the four substituent groups is halogen.

The general conditions and factors utilized for polymerizing 5- and 6-membered lactams, pursuant to the present invention, may be those mentioned in U.S. Patent No. 2,739,959, except for the presence of the halide of a Group IV element described in the foregoing, as the chain initiator for the polymerization, in place of the activators specified in that patent. In general, the method of effecting polymerization of 5- and 6-membered ring lactams, by the process of the present invention is as follows:

Initially, there is the preparation of an anhydrous solution of the alkali pyrrolidone in pyrrolidone. The alkali pyrrolidone usually employed in sodio or potassio pyrrolidone, and may be obtained via the reaction of pyrrolidone with sodium and potassium metal or the respective hydroxides. In the latter case, it is essential to remove the water formed thereby as rapidly as possible. The concentration of the alkali pyrrolidone employed in many instances may vary from 0.5 to 5.0 mole percent, (percentages based on pyrrolidone), and may range from 0.1 to 10.0 mole percent. In a series of experiments, optimum yields were obtained with about 2.75 mole percent of alkali pyrrolidone, in excess of the amount required to react with all of the halogen groups of the initiator. (Total catalyst was 4.75 mole percent where 2 equivalent percents of initiator was used and 3.75 mole percent where 1 equivalent percent of initiator was used.) The role of the alkali pyrrolidone is that of a catalyst and serves as a source of pyrrolidone anions.

The amount of chain initiator employed in many instances may vary from 0.1 to 10.0 mole percent (percentage based on pyrrolidone). The concentration of chain initiator chosen will depend on the conversion desired and the molecular weight sought. The rate of the polymerization will depend, to a large extent, on the molar amount of chain initiator employed, with higher rates obtained by the use of greater amounts of chain initiator. The polymerizations may be chain initiated at temperatures from 25° C. to 65° C. and are accompanied by a mild exothermic reaction.

In a bulk or mass polymerizaiton, the addition of the chain initiator is followed by a thickening of the solution and gradual solidification of the mixture. The toughness of the cake will, obviously, depend on the extent of the conversion and will be dependent on the times involved and amounts of chain initiators used.

The polymerization employing the foregoing chain initiators may be conducted in a dispersion of pyrrolidone and the alkali pyrrolidone in a non-solvent for the pyrrolidone. Applicable non-solvents fall in the class of unsaturated and olefinic aliphatic alicyclic hydrocarbons, i.e., pentane, hexane, heptane, cyclohexane, pentene, cyclohexene, etc. The amount of non-solvent frequently employed is 1 to 3 parts of non-solvent per unit weight of pyrrolidone. Applicable non-solvents fall in the class of satu- of the resulting polymer obtained, via a dispersion polymerization may vary from a thick curd to a fine powder, depending on conversion desired, ratio of non-solvent to monomer and type as well as rate of agitation.

For the purposes of comparison, there are given below, as examples A and B, illustrations of the prior art polymerization of highly purified pyrrolidone, from the same batch and purified in the same manner as the pyrrolidone used in the examples appearing later in the specification of the process of the present invention:

Example A

A 500 cc. glass flask was charged with 100.0 grams (1.18 moles) of highly purified pyrrolidone. There was added 1.0 gram of potassium hydroxide flakes of 83% assay, the system immediately placed under a reduced pressure of 10 mm. and rapidly heated to the reflux point of 120 to 125° C. The vapors were condensed in a vertical reflux condenser maintained at a jacket temperature of 75° C., thus permitting the return of the pyrrolidone and, at the same thing, effecting the removal of water. After one hour at the reflux point, the reaction mixture in the still pot was cooled and the clear, colorless solution of potassio pyrrolidone in pyrrolidone allowed to stand for 24 hours at room temperature to the exclusion of atmospheric moisture and carbon dioxide. During the 24 hours period, the mixture became turbid and a scant amount of solid was deposited. The mixture was treated with 400 grams of distilled water, the solid filtered and thoroughly washed with water. The dried polymer weighed 0.6 gram, representing a conversion of 0.6%. The material was of low molecular weight, as indicated by the relative viscosity of a 1% solution in meta cresol.

Example B

This example is an illustration of an alternate polymerization of highly purified pyrrolidone, and closely follows Example 1, of U.S. Patent No. 2,739,959, which is also an illustration of prior art polymerization of pyrrolidone.

A 500 cc. glass flask, equipped for vacuum distillation, was charged with 120.0 grams of highly purified pyrrolidone. There was added 1.0 gram of potassium hydroxide flakes of 83% assay. The system was immediately placed under a reduced pressure of 1.0 mm. and rapidly heated to effect the distillation at 90 to 100° C., of 20 grams of pyrrolidone and water. The resulting clear, colorless solution in the still pot constituted a solution of potassio pyrrolidone in pyrrolidone. The solution was allowed to cool to room temperature and stand for 24 hours to the exclusion of atmospheric moisture and carbon dioxide. During this 24 hour period the mixture became turbid and a scant amount of solid was deposited. The contents were treated with 400 grams of distilled water, the solid filtered and thoroughly washed with water. The dried polymer weighed 0.5 gram, representing a conversion of 0.5%. The material was of low molecular weight as indicated by the relative viscosity of a 1% solution in meta cresol.

The details of the present invention will be apparent to those skilled in the art, from the following specific examples, of preferred methods of practicing the same:

EXAMPLE I

This example illustrates the use of carbon tetrachloride as a chain initiator.

A 300 ml. glass flask was charged with 60 g. of highly purified pyrrolidone and 1.5 g. of potassium hydroxide flakes of 83% assay. After removing water of reaction by distilling about 10 g. of liquid at 115° C./6 mm. during a heating period of 15 minutes, the liquid residue, which consisted of a mixture of pyrrolidone and potassium pyrrolidone, was cooled and at 34° C. there was added 0.14 ml. (1.48 millimoles) of dry carbon tetrachloride. Based upon 50 g. of available monomer, the molar concentration of the chain initiator was 0.25%. After 72.5 hours of reaction under an atmosphere which had been purged with dry nitrogen and protected from contamination by moisture and carbon dioxide, the hard, light brown product was dissolved in 75 ml. of 90% formic acid. The viscous solution which resulted was poured into 2-l. of distilled water to precipitate polymer which was then washed with water until the final washing was essentially free of acid. After drying to constant weight at 100° C./0.6 mm., the product polypyrrolidone, which was off-white in color, weighed about 32.5 g., representing a conversion of about 69%. It had a relative viscosity (of a solution of 1 gram of polymer in 100 grams of m-cresol, hereinafter abbreviated "$c=1$, m-cresol") of 4.217. (The calculation of percent conversion is based upon the assumption that there remains with the polymer all of the initiator other than the halogen atoms. This device will be used in all subsequent calculations.)

EXAMPLE II

This experiment exemplifies the use of silicon tetrachloride in a suspension polymerization.

In a manner similar to the above, using a 300 ml. flask, potassium pyrrolidone was prepared from a mixture of 120 g. of pyrrolidone and 3.0 g. of potassium hydroxide flakes of 83% assay by distilling about 20 g. at 116° C./7 mm. Of the residue, which weighed 100.5 g., 98.5 g. (representing 94.0 g. of available monomer, if one subtracts the weight of potassium cation and pyrrolidone anion from the total weight transferred, a calculation procedure which will be employed throughout the experiments following) was transferred to 300 ml. of dry heptane contained in a 3-neck 1-l. flask fitted with a Hershberg stirrer, drying tube for the exclusion of atmospheric moisture and carbon dioxide, and an adapter for both a thermometer and for permitting the playing of a stream of dry nitrogen over the surface of the reaction mixture. At 33° C. there was added 0.33 ml., or 0.25 mole percent, based upon 100 g. of available monomer, of silicon tetrachloride. Solids were formed in two hours. After a polymerization time of 24 hours, the product polypyrrolidone was filtered, washed with methanol, stirred with dilute formic acid, then washed essentially free of acid to give, after drying at 100° C./0.3 mm., 56.3 g. of polymer of relative viscosity ($c=1$, m-cresol) 6.083. From the reaction mixture there was also obtained an amount of very hard solid which, after solution in 90% formic acid, precipitation in water and washing, amounted to 14.5 g. Its relative viscosity ($c=1$, m-cresol) was 5.980. The total conversion was, therefore, 70.8 g., or 75.0%.

When other silicon tetrahalides, e.g. silicon tetraiodide, silicon tetrabromide or silicon tetrafluoride are used in place of silicon tetrachloride in the foregoing Example II, polypyrrolidone is produced in substantial amounts, while when no chain initiator was employed with the same batch of pyrrolidone under otherwise identical conditions, less than 1% polymer was produced.

EXAMPLE III

This example illustrates the use of dodecyltrichlorosilane as the chain initiator in a suspension polymerization.

In a manner similar to that described above, 98.5 g. (94.0 g. of available monomer, from 120 g. of pyrrolidone and 3.0 g. of potassium hydroxide of 83% assay) was suspended in 300 ml. of dry heptane and treated at 34° C. with 1.2 ml. (about 0.33 mole percent based upon 100 g. of monomer) of dodecyltrichlorosilane. After a reaction time of 24 hours, the white product, polypyrrolidone, was worked up as described before to give 34.6 g. (36% conversion) whose relative viscosity ($c=1$, m-cresol) was 11.492.

EXAMPLE IV

This example illustrates the effect of polymerizing in bulk, using the same amount of materials as in Example III.

Using the same amount of materials as in Example III, with the monomer-catalyst mixture weighing 105.2 g. (100.7 g. of available monomer), the addition of the chain initiator to the mixture, without prior suspension in heptane, gave, after 24 hours, an intractable mass which was dissolved in 90% formic acid, precipitated in water and washed until it was essentially free of acid to give 49.2 g. (48% conversion) of polypyrrolidone in the form of a white powder of relative viscosity ($c=1$, m-cresol) 8.187.

EXAMPLE V

This experiment exemplifies the effect of increasing the concentration of the chain initiator while maintaining constant the concentration of available catalyst (assuming all of the chlorine atoms of the initiator to react).

In the manner described in Example II, a charge of 101.0 g. (96.1 g. of available monomer, from 130 g. of pyrrolidone and 3.8 g. of potassium hydroxide flakes of 83% assay) was initiated with 2.26 ml. (about 0.67 mole percent, based upon 100 g. of monomer) of dodecyltrichlorosilane. After 24 hours and the customary work-up, there was obtained 66.8 g. (67.8% conversion) of polymer of relative viscosity ($c=1$, m-cresol) 9.190.

EXAMPLE VI

The following illustrates the effect of polymerization time on conversion and viscosity.

Repeating Example V but charging 98.6 g. of catalyst mixture (93.7 g. of available monomer), termination of the polymerization after four hours gave 22.4 g. (22% conversion) of product with a relative viscosity ($c=1$, m-cresol) of 6.522.

EXAMPLE VII

This example illustrates the effect upon conversion and viscosity of varying the catalyst:initiator ratio.

In the manner usual for suspension polymerizations, there was charged 98.7 g. of catalyst mixture (95.2 g. of available monomer, from 130 g. of pyrrolidone and 3.0 g. of potassium hydroxide flakes of 83% assay) to 300 ml. of dry heptane; initiation was effected at 33° C. with 2.26 ml. (about 0.67 mole percent, based upon 100 g. of monomer) of dodecyltrichlorosilane. After 24 hours of reaction, the usual processing resulted in 52.5 g. (53.5% conversion) of relative viscosity ($c=1$, m-cresol) 10.726.

EXAMPLE VIII

This experiment illustrates the effect of preparing the catalyst at 100° C. Compare with Example VII.

In the manner usual for suspension polymerizations, there was charged 98.9 g. (95.4 g. of available monomer, from 120 g. of pyrrolidone and 3.0 g. of potassium hydroxide of 83% assay) of catalyst mixture prepared by adding the base to the monomer previously heated to 100° C. under dry nitrogen. The addition of about 0.67 mole percent of dodecyltrichlorosilane (based on 100 g. of monomer) at 31° C. resulted, after 24 hours and the usual processing, in 23.6 g. (23% conversion) of polymer product of relative viscosity ($c=1$, m-cresol) 3.878.

EXAMPLE IX

The following illustrates the effect of increasing the chain-initiator concentration still further, keeping invariant the concentration of available catalyst. Compare this experiment with Examples III and V.

As in Example II, suspension polymerization was effected with 101.9 g. (96.5 g. of available monomer, from 130 g. of pyrrolidone and 4.6 g. of potassium hydroxide flakes of 83% assay) and 3.4 ml. (about 1 mole percent, based upon 100 g. of monomer) of dodecyltrichlorosilane. After 24 hours and the customary work-up, there was obtained 71.4 g. (71.5% conversion) of polypyrrolidone of relative viscosity ($c=1$, m-cresol) 7.930.

EXAMPLE X

This experiment illustrates the effect of varying the alkyl group on the alkyltrichlorosilane initiator; in this case, ethyl replaces dodecyl.

Using the amounts of pyrrolidone and potassium hydroxide and the same procedure as detailed in Example V, a catalyst-monomer charge of 100.1 g. (representing 95.2 g. of available monomer) was polymerized in suspension with 1.0 ml. (about 0.67 mole percent, based upon 100 g. of monomer) of ethyltrichlorosilane. After 24 hours, there was obtained 70.4 g. (72.3% conversion) of polypyrrolidone of relative viscosity ($c=1$, m-cresol) 7.620.

EXAMPLE XI

This example illustrates the use of a chain initiator containing a bis-(trichlorosilyl) group in the same equivalent concentration as was used for dodecyltrichlorosilane in Example III (about 1 equivalent percent).

Repeating Example III above, with the catalyst-monomer mixture weighing about 100 g. (95.5 g. of available monomer), but using as the chain initiator 0.41 ml. (1 equivalent percent, based upon 100 g. of monomer) of bis-(trichlorosilyl)ethane, there was obtained 55.2 g. (about 58% conversion) of polypyrrolidone of relative viscosity ($c=1$, m-cresol) 8.213.

EXAMPLE XII

This example illustrates the use of a dialkyldichlorosilane as the chain initiator.

In the manner described in Example III, with the catalyst-monomer mixture weighing 98.9 g. (94.4 g. of available monomer), initiation was effected with 0.72 ml. (0.5 mole percent, based upon 100 g. of monomer) of dimethyldichlorosilane. The product was obtained in a conversion of about 15% of polypyrrolidone which had a relative viscosity ($c=1$, m-cresol) of 11.440.

EXAMPLE XIII

This example serves to illustrate the use of a trialkylchlorosilane as the chain initiator.

In a manner similar to that described in Example III, a catalyst-monomer charge of 100.0 g. (95.5 g. of available monomer) was initiated with 1.50 ml. (1 mole percent, based upon 100 g. of monomer) of trimethylchlorosilane. After 24 hours, addition of 200 ml. of methanol, concentration of the reaction mixture on the steam bath and in vacuo, followed by chilling the residue and adding cold water gave, upon filtering and drying, 1.7 g. of polypyrrolidone of relative viscosity ($c=1$, m-cresol) 7.404.

EXAMPLE XIV

This experiment illustrates the effect of varying the concentration of trialkylchlorosilane initiator while maintaining constant the concentration of available catalyst. Compare with Example XIII.

After preparing potassium pyrrolidone from the same amounts of materials as described in Example V, there was charged 101.6 g. (96.7 g. of available monomer) of catalyst mixture which was then initiated with 3.0 ml. (2 mole percent, based upon 100 g. of monomer) of trimethylchlorosilane. After 24 hours of reaction there was obtained 10.0 g. (8.6% conversion) of polypyrrolidone of relative viscosity ($c=1$, m-cresol) 19.806.

EXAMPLE XV

This example illustrates the use of titanium tetrachloride as the chain initiator.

In the usual manner, catalyst mixture was prepared from 120 g. of highly purified pyrrolidone and 3.0 g. of potassium hydroxide flakes of 83% assay. Distillation of water was effected at 127° C./10 mm. Of the residue, which weighed 101.6 g., 99.6 g. (95.1 g. of available monomer) was charged to 300 ml. of dry heptane and initiated at 32° C. with 0.32 ml. (0.25 mole percent, based upon 100 g. of monomer) of titanium tetrachloride. After 24 hours of reaction, the customary processing gave 70.8 g. (74.4% conversion) of polypyrrolidone of relative viscosity 5.046.

EXAMPLE XVI

This example illustrates the use of stannic chloride as the initiator.

As for Example I above, but starting with 65 g. of pyrrolidone and 1.5 g. of potassium hydroxide flakes of 83% assay, distillation of water of reaction left a residue of 51.7 g. (49.4 g. of available monomer). Initiation in bulk at 30° C. was effected with 0.17 ml. (0.25 mole percent, based upon 50 g. of monomer) of anhydrous stannic chloride. After a reaction time of 75 hours, the product was stirred with methanol and water and dried in vacuo at 100° C. to give 9.1 g. (18% conversion) of polypyrrolidone whose relative viscosity ($c=1$, m-cresol) was 37.050.

EXAMPLE XVII

Piperidone may also be polymerized by a process of the present invention in the same manner as pyrrolidone by merely substituting piperidone for pyrrolidone in one of the foregoing examples. In order to fully illustrate the polymerization of piperidone by the process of the present invention the following specific example thereof is given for dodecyltrichlorosilane as initiator.

A solution of potassium α-piperidone in α-piperidone was prepared from 109.1 g. of purified α-piperidone and 3.2 g. of potassium hydroxide flakes of 83% assay and distilling 10.2 g. at reduced pressure. Initiation of the residue with 1.98 ml. (0.67 mole percent, based on 99.1 g. of α-piperidone) of dodecyltrichlorosilane, followed by bulk polymerization at room temperature for 24 hours with subsequent solution of the product, poly-α-piperidone, in 90% formic acid, reprecipitation in water, washing to neutrality and drying in vacuo, gave fair yields of relatively high viscosity material.

While an N-pyrrolidonyl, or N-piperidonyl group appears to be the usual chain-terminating group of the polymers obtained, pursuant to the present invention, it will be apparent to those skilled in the art, that the polymer chains may be otherwise terminated, for instance, by the formation of the acids and the metal and ammonium salts thereof, as well as esters and amides, which may arise by reaction of the active polymer intermediate with alkaline compounds, hydroxyl-containing compounds, or amines.

As samples of specific reagents, which may be employed to terminate the polymer chains, otherwise than in a pyrrolidonyl or piperidonyl radical, may be mentioned water, sodium hydroxide, sodium methylate, methanol, ethanol, phenol, ammonia, ethylamine, aniline, diethanolamine. Reaction of the free polymer acid with alkaline agents such as metal hydroxides and amines gives the respective salts. The various terminations proceed through scission of the terminal pyrrolidone ring, or one of the polymide linkages, particularly the linkage between terminal pyrrolidonyl linkage and the carbonyl grouping linked thereto. Termination of the polymer chain by means of an ester, such as —NH—CH$_2$CH$_2$CH$_2$COOCH$_3$ may be accomplished by treatment of the polymer intermediate, with methanol in the presence of a base.

Hydrolysis of the terminal ring may be accomplished by treating the alkaline containing white solid, obtained in the polymerization, with water at 75–80° C. for one hour. The resulting product is terminated by a

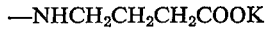

group. Conversion to the free acid, and, consequently to the other metal and ammonium salts, is accomplished by acidification and respective action of alkalizing agents.

The products of the present invention are, as indicated, polyamides of the nylon-4 type from pyrrolidone, or nylon-5 from piperidone; and, as such, are useful in the arts as in many applications of nylon. In particular, the products of the present invention, particularly, those of relatively high molecular weight, e.g. products which have a relative viscosity of about 2.5 or higher, as a 1% solution in the m-cresol, are useful for the production of fibers for textile and other uses—e.g., as insulating blankets, etc. Fibers have been successfully produced from products of the present invention, by drawing from a melt and spinning from solutions, such as solution in formic acid, followed by evaporation of solvent. Useful films, having a wide variety of applications, may also be produced from the products of the present invention by melt-extrusion and by film-casting from solutions, such as a formic acid solution, glycolic or lactic acid solution, followed by removal of the solvent. Such films are useful in numerous applications, including electrical applications, as an insulator; as a base for industrial tapes; as a lining material or glass replacement, and in a variety of special packaging applications. The products of the present invention may also be used in plastic compression molding and extrusion molding applications, where their crystalline nature, sharp melting point and marked fluidity, in the molten state, results in faithful reproduction of the mold. Molded products, for use as containers, may be produced from powders obtained pursuant to the present invention; and, also, many mechanical and other engineering parts and materials, such as gears, cams bearings, and similar machine components may be produced from them. In the electrical arts, the products of the present invention are useful as a coating on wire, etc., as an insulation, and for the production of certain mechanical, electrical parts, such as insulating bushings, fuse holders, and the like. The products are also of interest in the coating arts as finishes for textiles, paper and similar fibrous materials, and for use as special adhesives and other coatings.

It should also be understood that the products of the present invention may be compounded in many applications with other synthetic plastic materials, plasticizers and fillers. Among the plasticizers, which have been found to be compatible with the products of the present invention, may be mentioned, o- and p-toluenesulfonamide, N-ethyl o- and p-toluenesulfonamide, ethylene carbonate and propylene carbonate.

While the halides of Group IV elements of the formula given in column 1 of the present specification have been found to be operative as a class for initiating the polymerization of lactams of the class described immediately above, I particularly prefer the organohalogenosilanes. There are indications that the polymers obtained with such silane initiators have slightly improved thermal stability as compared with the polymers obtained when the halides of other Group IV elements are employed. A number of such organohalogenosilanes are illustrated in the foregoing examples and illustrative of the organohalogenosilanes which are useful in practicing the present invention are the following compounds: CH$_3$SiF$_3$, (CH$_3$)$_2$SiF$_2$, (CH$_3$)$_3$SiF, CH$_3$SiHCl$_2$, (C$_2$H$_5$)$_3$SiCl, CH$_3$SiBr$_3$
(CH$_3$)$_2$SiBr$_2$, (CH$_3$)$_3$SiBr, (C$_6$H$_5$)$_2$SiBr$_2$, CH$_3$SiCl$_3$
C$_2$H$_3$SiCl$_3$, C$_3$H$_5$SiCl$_3$, ClC$_3$H$_4$SiCl$_3$, nC$_3$H$_7$SiCl$_3$
nC$_4$H$_9$SiCl$_3$, C$_5$H$_{11}$SiCl$_3$, C$_6$H$_5$SiCl$_3$, ClC$_6$H$_4$SiCl$_3$
Cl$_2$C$_6$H$_3$SiCl$_3$, C$_6$H$_9$SiCl$_3$, C$_6$H$_{11}$SiCl$_3$, C$_{12}$H$_{25}$SiCl$_3$
C$_{16}$H$_{33}$SiCl$_3$, C$_{18}$H$_{37}$SiCl$_3$, C$_2$H$_4$(SiCl$_3$)$_2$, (CH$_3$)$_2$SiCl$_2$
C$_2$H$_5$SiHCl$_2$, C$_2$H$_5$(C$_2$H$_3$)SiCl$_2$, (C$_2$H$_5$)$_2$SiCl$_2$
(C$_6$H$_5$)$_2$SiCl$_2$, (CH$_3$)$_3$SiCl, (C$_6$H$_5$)$_3$SiCl While the production of polymers of 2-pyrrolidone and 2-piperidone has specifically been described in the foregoing examples it will be apparent that the process of the present invention may be employed for the production of polymers of homologues of 2-pyrrolidone and 2-piperidone which contain a lower alkyl (1–4 carbon atoms) substituent on the carbon atoms in the ring. Such alkyl substituted pyrrolidones and piperidones which have been found to be most readily polymerized by the process of this invention are those in which certain alkyl substituents in the 3 and 4 positions such as 3-methyl-2-pyrrolidone, 4-methyl-2-pyrrolidone, 4-ethyl-2-pyrrolidone, 3,3-dimethyl-2-pyrrolidone, 4,4 - dimethyl - 2-pyrrolidone, 3-methyl-2-piperidone, and 3-ethyl-2-piperidone. The alkyl substituted pyrrolidones and piperidones may be represented by the general formula

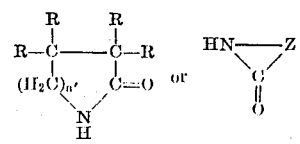

wherein Z represents

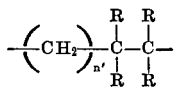

where $n'$ is one of the integers 1 and 2 and the R's represent a member of the group consisting of H and lower alkyl groups of 1 to 4 carbon atoms. The polymeric unit of the polymers produced on polymerizing them in accordance with the present invention may thus be represented by the general formula

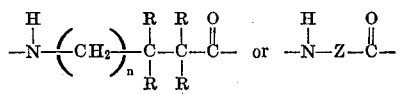

I claim:

1. In the process of polymerizing pyrrolidone under anhydrous conditions in the presence of a minor amount up to about 10 mole percent based on said pyrrolidone of an alkali metal pyrrolidone as the polymerization catalyst; the improvement comprising effecting the polymerization in the presence of a minor amount up to about 10 mole percent based on said pyrrolidone of carbon tetrachloride.

References Cited

UNITED STATES PATENTS

| | | | |
|---|---|---|---|
| 2,622,076 | 12/1952 | Koch | 260—78 |
| 2,739,959 | 3/1956 | Ney et al. | 260—78 |
| 2,806,841 | 9/1957 | Barnes et al. | 260—78 |

FOREIGN PATENTS

| | | |
|---|---|---|
| 870,484 | 3/1942 | France. |
| 1,093,850 | 11/1954 | France. |

OTHER REFERENCES

Remy Treatise on Inorganic Chemistry, vol. 1, 1956, pp. 3 and 4, publ. by Elsevier Publ. Co. Houston 25, Tex.

WILLIAM H. SHORT, *Primary Examiner.*

H. D. ANDERSON, *Assistant Examiner.*